United States Patent [19]
Puetz

[11] 3,987,338
[45] Oct. 19, 1976

[54] PICK-UP UNIT FOR BALANCING ROTATING BODIES

[75] Inventor: Peter A. Puetz, Davenport, Iowa

[73] Assignee: Applied Power Inc., Milwaukee, Wis.

[22] Filed: Mar. 26, 1975

[21] Appl. No.: 562,181

[52] U.S. Cl. ............................. 315/241 S; 73/466; 250/231 R; 315/159
[51] Int. Cl.² ................... G01M 1/22; H05B 37/00
[58] Field of Search ............ 250/231 R, 229, 214 R, 250/211 K; 315/149, 156, 157, 159, 241 S; 73/466, 70, 71.1, 71.3

[56] References Cited
UNITED STATES PATENTS

| | | | |
|---|---|---|---|
| 2,000,731 | 5/1935 | Young | 315/241 S X |
| 2,521,141 | 9/1950 | Allen | 315/241 S X |
| 2,651,937 | 9/1953 | Martin et al. | 315/241 S X |
| 2,816,445 | 12/1957 | Rambo | 315/241 S X |
| 3,159,024 | 12/1964 | Tsien | 250/231 R X |
| 3,772,919 | 11/1973 | Senften | 73/466 X |

Primary Examiner—Eugene La Roche
Attorney, Agent, or Firm—Edward D. Gilhooly

[57] ABSTRACT

A vibration pick-up unit for balancing rotating bodies such as vehicle wheels comprises a housing having a tubular guide communicating with the interior of the housing, a plunger rod disposed telescopically in the tubular guide for axial and rotary movement, a permanent magnet attached pivotally on an end of the rod for engagement with a vibrating member of a wheel suspension system arising on rotation of the wheel, a first mounting member disposed within the housing and cooperating operatively with the tubular guide, the first mounting member being movable in response to the vibrations of the suspension system, a second mounting member disposed within the housing adjacent the first mounting member, light means disposed in the second mounting member for generating a source of light, photo-sensitive means disposed in the first mounting member and being responsive to the light means for converting the vibrations of the suspension system into an electric sinusoidal signal and circuit means connected operatively to the photo-sensitive means. The circuit means generates electrical impulses to flash a stroboscopic light onto the rotating wheel in synchronism with the vibrations of the suspension system.

13 Claims, 10 Drawing Figures

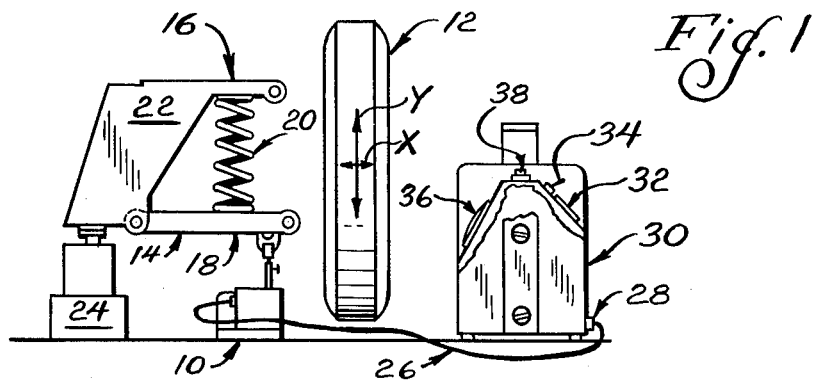
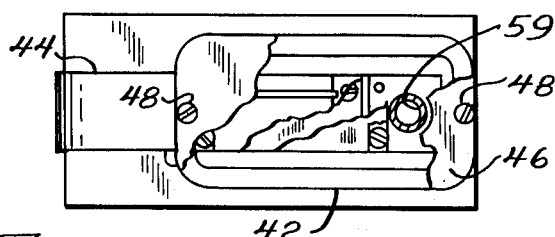
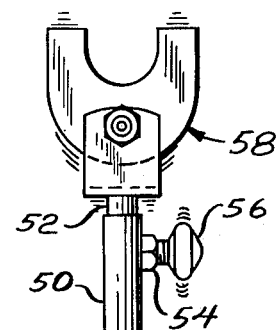
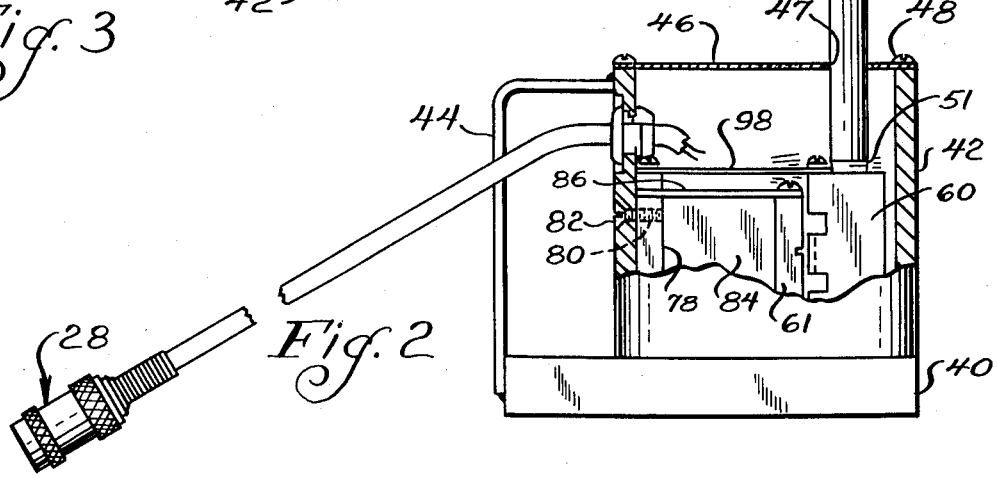
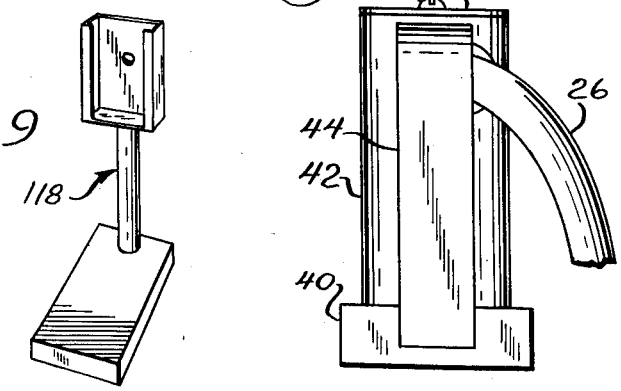
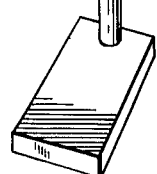
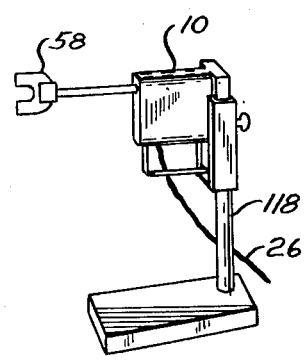

PICK-UP UNIT FOR BALANCING ROTATING BODIES

BACKGROUND OF THE INVENTION

This invention relates generally to apparatuses for detecting and locating the area of apparent concentration of unbalanced weight or mass in unbalanced rotating bodies and more particularly, it relates to an improved pick-up unit which finds application in balancing rotating bodies such as vehicle wheels by utilization of a stroboscopic light type to detect and locate the area of apparent unbalance.

The apparent area of unbalance in rotating bodies heretofore has been detected and located by various ways. Conventional stroboscopic type unbalance detection apparatus utilizes either a velocity pick-up or an acceleration pickup which follows the vibrations of the rotating body and generates a corresponding signal. Such pick-ups usually comprise a permanent magnetic core and a multi-turn coil, the core and the coil being movable relative to each other to generate the corresponding signal. It is known for a fact that the displacement of the unbalanced rotating body will lag the locus of the unbalanced mass by 90° when the rotational speed coincides with the critical or resonant speed of the rotating body. Thus, compensator circuitry such as 90° phase shifter networks were required in such prior art pick-ups to properly synchronize the stroboscopic illumination with the rotating bodies so as to detect and locate the apparent area of unbalance.

It has been discovered by the use of a new and novel pick-up unit of the displacement type simpler and less expensive electronic circuitry may be utilized to trigger the stroboscopic light in synchronization with the unbalanced rotating body so as to detect and locate the apparent area of unbalance.

SUMMARY OF THE INVENTION

Accordingly, it is an object of the present invention to provide an improved pick-up unit of the displacement type for balancing rotating bodies.

Another object of the present invention is to provide an improved pick-up unit having simple and inexpensive electronic circuitry for activating the stroboscopic light for detecting and locating the apparent area of unbalance.

In accordance with these aims and objectives, the present invention is concerned with the provision of a vibration pick-up unit for balancing rotating bodies such as vehicle wheels comprising a housing having a tubular guide communicating with the interior of the housing, a plunger rod disposed telescopically in the tubular guide for axial and rotary movement, a permanent magnet attached pivotally on an end of the rod for engagement with vibrating member of a wheel suspension system arising on rotation of the wheel, a first mounting member disposed within the housing and cooperating operatively with the tubular guide, a second mounting member disposed within the housing adjacent the first mounting member, light means disposed within the second mounting member for generating a source of light, photosensitive means disposed in the first mounting member, and circuit means connected operatively to the photo-sensitive means. The first mounting member is movable in response to the vibrations of the suspension system. The photosensitive means is responsive to the light means for converting the vibrations of the suspension system into an electric sinusoidal signal. The circuit means generates electrical impulses to flash a stroboscopic light onto the rotating wheel in synchronism with the vibrations of the suspension system.

The photo-sensitive means of the invention comprises a photo-potentiometer and the light means comprises a light-emitting diode.

The circuit means comprises a buffer amplifier operatively connected to the photo-sensitive means for converting the vibrations of the suspension system to the electric sinusoidal signal, a meter amplifier having its input connected to the buffer amplifier, an amplifier connected to the meter amplifier for inverting and converting the electric signal therefrom to a square wave signal, and a differentiator network connected to the converting amplifier to convert the square wave signal to the electrical impulses to flash the stroboscopic light.

BRIEF DESCRIPTION OF THE DRAWINGS

These and other objects and advantages of the present invention will become apparent from the following detailed description when read in conjunction with the accompanying drawings, wherein:

FIG. 1 illustrates a front wheel of a vehicle and its suspension system that have been mechanically elevated; a vibration pick-up unit of the present invention attached to the suspension system for determining static unbalance of the wheel;

FIG. 2 is an enlarged side elevational view, partly sectionalized, showing the vibration pick-up unit of the present invention;

FIG. 3 is a partially sectionalized top plan view of the vibration pick-up unit of FIG. 2, according to the present invention;

FIG. 4 is a left side view of the vibration pick-up unit of FIG. 2, according to the present invention;

FIG. 9 is an adapter bracket assembly for positioning of the pick-up unit on its side during dynamic unbalance; and FIG. 10 is the adapter bracket assembly with the pick-up unit installed on its side during dynamic unbalance.

DETAILED DESCRIPTION OF THE PREFERRED EMBODIMENT

Figure 5:
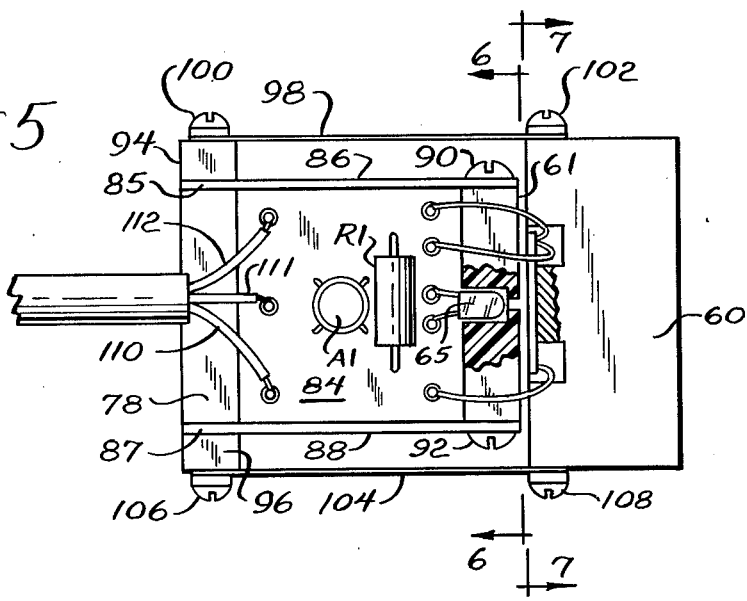
FIG. 5 is a side elevational view of the vibrational pick-up unit of FIG. 2 showing the details of the components of the pick-up unit.

Referring now to the drawings, there is illustrated fragmentarily in FIG. 1 a conventional set-up for wheel balancing by utilization of stroboscopic light, except for the specific form of vibration pick-up unit 10 depicted. In FIG. 1, the conventional king pin and/or ball joint assembly for attaching the wheel 12 to its spring suspension system 14 has been omitted for the sake of clarity in showing the balancer components. The suspension system 14 comprises an upper control arm 16, a lower control arm 18, and a coil spring 20.

For purposes of checking the balance of the wheel as will be described hereinafter, a vehicle frame 22 is elevated by a jack 24 so that the wheel 12 is supported above the floor or subjacent surface by means of its spring suspension system 14. The wheel 12 rotates about a horizontal axis X and steers or turns about a vertical axis Y.

A multi-conductor cable 26 extends from the pick-up unit 10 and through a connector 28 to a stroboscopic unit 30. The stroboscopic unit contains appropriate electrical circuitry, a meter 32 connected to the electrical circuitry for registering the magnitude of the signal produced by the pick-up unit, a switch 34 for selecting the sensitivity of the meter, a stroboscopic light 36 adapted to be flashing in synchronism with the vibrations of the wheel, and a switch 38 for turning on the stroboscipic light. The stroboscopic unit is portable so that it can be placed in a location opposite the wheel 12 with the stroboscopic light 36 postioned to flash light on the wheel.

Referring to FIGS. 2 through 5, the pick-up unit 10 shown in detail comprises a housing 40 made preferably of a heavy material such as steel or iron and having an upper tubular portion 42 and a handle 44 for carrying the unit from place to place. In the present form shown, the housing 40 is provided with a removable top cover plate 46 to permit assembly of the access to the elements contained therein. The cover plate is secured in place by screws 48 as shown in FIGS. 2 and 3.

A tubular guide 50 extends into the interior of the housing 40 by way of an opening 47 in the cover plate 46. A plunger rod 52 is disposed telescopically in the tubular guide for axial and rotary movement. A nut 54 is welded on the upper end of the tubular guide, and a thumb screw 56 is provided to be tightened in the nut so as to lock the rod 52 inside the tubular guide at the desired height. Since most parts of automotive vehicles are ferromagnetic, a U-shaped permanent magnet 58 is attached pivotally on the extreme end of the rod to facilitate secure attachment and ready detachment of the pick-up unit to the suspension system.

Figure 7:
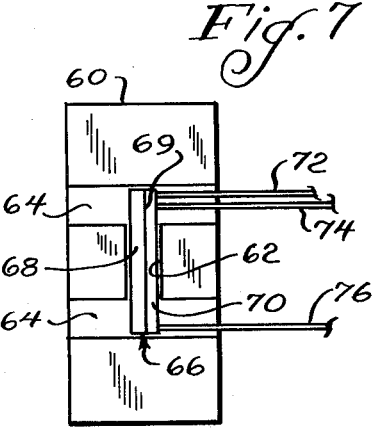
FIG. 7 is a sectionalized view taken along the lines 7—7 of FIG. 5, looking in the direction of the arrows.

A mounting block 60 made preferably of aluminum has a cylindrical bore 59 which is threaded internally at the top to accommodate the externally threaded end 51 of the tubular guide 50. As best seen in FIG. 7, the mounting block 60 has a vertical groove 62 and two horizontal grooves 64 to accommodate a photo-potentiometer 66. The photo-potentiometer 66 is preferably embedded in and epoxied in the grooves 62, 64. The photo-potentiometer comprises a metal thin film resistive layer 68, a photoresistive layer 69, a conductive layer 70, and lead wires 72, 74, and 76.

Figure 6:
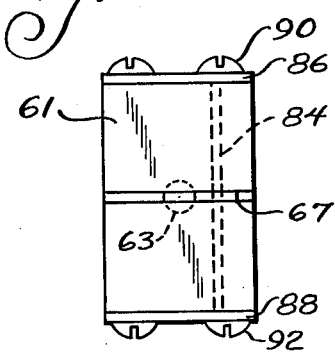
FIG. 6 is a sectionalized view taken along the lines 6—6 of FIG. 5, looking in the direction of the arrows.

A non-conducting mounting block 61 made of a dielectric material such as reinforced phenolic resin is disposed opposite the mounting block 60. As best seen in FIGS. 5 and 6, the block 61 has an opening 63 to accommodate a light-emitting diode 65.

A voltage is applied across the lead wires 72 and 76 of the photo-potentiometer which are connected to the respective ends of the thin film resistive layer. An output voltage is obtained across the lead wires 74 and 76 of the photo-potentiometer 66 and is proportional to the applied voltage dependent upon the relative position of the light from the light emitting diode 65 impinging upon the photo-resistive layer via slit 67 formed in mounting block 61.

A mounting block 78 is provided with mounting means such as threaded hole 80 and screws 82 (FIG. 2) for mounting the basic circuitry of the pick-up unit located on printed circuit board 84 within the housing. One end 85 of a plate 86 is connected to one end of the block 78. One end 87 of another plate 88 is connected to the other end of the block 78. The other end of the plate 86 is connected to one end of the block 61 via screws 90. The other end of the plate 88 is connected to the other end of the block 61 via screws 92.

A metallic spacer 94 is disposed adjacent the end 85 of the plate 86, and a metallic spacer 96 is disposed adjacent the end 87 of the plate 88. One end of a leaf spring 98 is connected to the spacer 94 via screws 100 which extend through the spacer 94 and the plate 86 and into the block 78. The other end of the leaf spring 98 is connected to the block 60 via means such as screws 102. One end of a leaf spring 104 is connected to the spacer 96 via screws 106 which extend through the spacer 96 and the plate 88 and into the block 78. The other end of the leaf spring 104 is connected to the block 60 via means such as screws 108.

Figure 8:
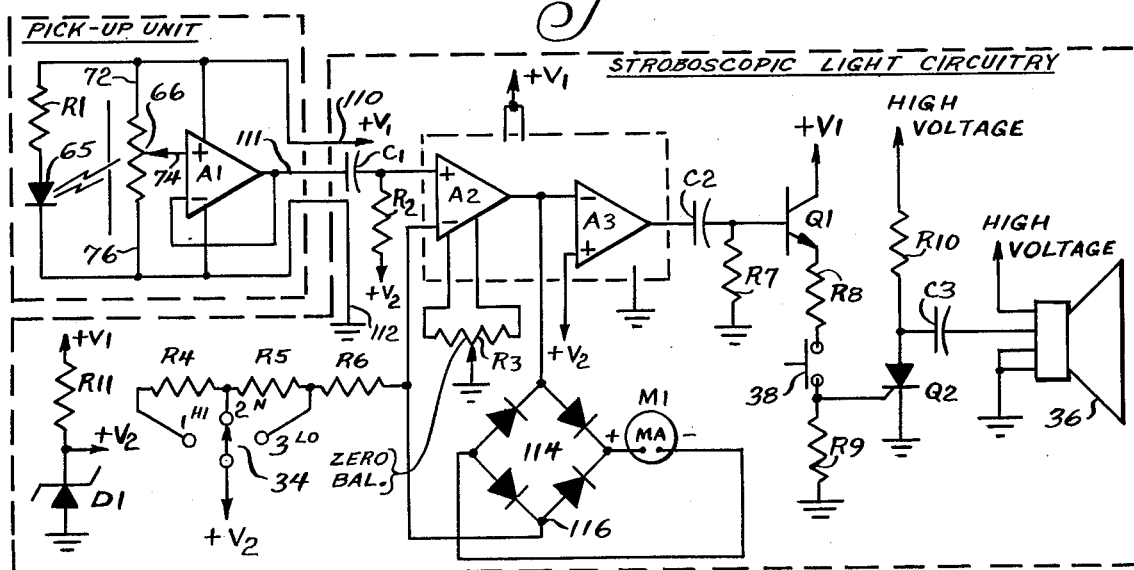
FIG. 8 is a schematic circuit diagram of the vibration pick-up unit and the associated components of the stroboscopic light circuitry.

FIG. 8 illustrates a schematic circuit diagram of the vibration pick-up unit and the associated components of the stroboscopic light circuitry. A lead wire 110 supplies a positive voltage $+V_1$ and is connected to one end of a resistor R1, the lead wire 72 of the photo-potentiometer 66, and the positive supply terminal of a buffer amplifier A1. The positive voltage $+V_1$ is reduced to a lower positive voltage $+V_2$ via a series connected resistor R11 and zener diode D1. The other end of the resistor R1 is connected to the anode of the light-emitting diode 65. A lead wire 112 connects a ground potential to the cathode of the light-emitting diode, the lead wire 76 of the photo-potentiometer 66 and the negative supply terminal of the amplifier A1. The lead wire 74 of the photo-potentiometer 66 is connected to the non-inverting input of the buffer amplifier A1. The output of the amplifier A1 is connected to its inverting input so as to provide negative feedback. The output of the amplifier A1 is also coupled by a lead wire 111 to the non-inverting input of a meter amplifier A2 via an A.C. coupling network comprising a capacitor C1 and a resistor R2. The meter amplifier A2 modifies the signal from the coupling network so as to drive adequately amplifier A3 and meter M1. A variable resistor R3 is connected to the amplifier A2 to zero-balance the output thereof. The output of the amplifier A2 is connected to a full-wave rectifier 114 of the bridge-type. The output of the bridge is connected to a millimeter M1. Interposed between the inverting input of the amplifier A2 and the point 116 of the bridge is a triple-throw switch 34 and three resistors R4, R5 and R6 for selecting a high, normal, or low sensitivity on the meter M1. An electrical signal corresponding to the vibrations of the vehicle suspension system appears at the output of the amplifier A2. This electrical signal is inverted and converted to a square wave signal by amplifier A3. The square wave signal is then differentiated by a capacitor C2 and a resistor R7 to produce pulses at the base of transistor Q1. The emitter of transistor Q1 is connected to one end of a resistor R8. The other end of the resistor R8 is connected to one contact to the switch 38. The other contact of the switch 38 is coupled to the gate of a silicon-controlled rectifier Q2 and to ground via resistor R9. Supply voltages are coupled to the collector of the transistor Q1 and one end of resistor R10. The other end of the resistor R10 is coupled to the anode of the silicon-controlled rectifier Q2 and to a trigger coil of the stroboscopic light via a capacitor C3.

As is generally known, forces generated by a rotating and balanced wheel usually are considered as two separate force components for balancing purposes. The unbalanced component of force or vibration occurring in a vertical direction parallel to the plane of rotation of the wheel is referred to as "static" unbalance. Static unbalance is normally corrected by applying a mass or weight of the requisite magnitude in an appropriate position on the periphery of the wheel rim. The unbalanced component of force or vibration occurring in a horizontal direction perpendicular to the plane of rotation of the wheel is referred to as "dynamic" unbalance. Dynamic unbalance is normally corrected by applying a weight of appropriate magnitude at one point on the outside rim of the wheel and a corresponding weight on the inside rim of the wheel at a diametrically opposite position.

In operation of the pick-up unit 10 for detecting static unbalance, the device is positioned beneath the suspension system 14 of the vehicle after the wheel itself has been jacked up so as to be rotatable free of the ground. The thumbscrew 56 may have to be loosened to permit telescopic movement of the rod 52 within the tubular guide 50 until the permanent magnet 58 contacts a flat surface of the suspension system 14 as close as possible to the wheel such as the lower control arm 20. After the rod has been so moved, the thumbscrew is tightened to lock the rod 52 at the desired elevation.

With the components of the pick-up unit 10 thus connected, a spinner (not shown) is then operated to rotate the wheel 12. The spinner may be of any conventional design and generally consists of an electric motor to drive a friction wheel which is urged against the treaded surface of the wheel 12 as is well-known in the art. The wheel is rotated preferably in the direction of rotation corresponding to forward movement of the wheel to a relatively high speed, after which the spinner is disengaged from the wheel 12 to permit the same to rotate freely.

Assuming the wheel to be out of balance, vertical vibrations are imparted to the rod 52 and the block 60. When the rod and the block vibrate upwardly and downwardly, the leaf springs 86 and 88 flex and unflex in response thereto due to the fact that they are effectively fixed to the block 60 at the one end. As the block 60 containing the photo-potentiometer 66 therein moves up and down, the light from the light-emitting diode 65 transmitted through the slit 67 impinges upon different vertical positions of the photo-resistive layer 68 of the photo-potentiometer and thus varying the output voltage of the photo-potentiometer in a regular cyclic manner. The output voltage of the photo-potentiometer is generally sinusoidal and proportional to the degree of vertical vibration and thus proportional to the amount of unbalance producing the vibration.

The upper and lower peaks of the sinusoidal signal corresponding respectively to the upper and lower limits of the wheel excursions on each revolution of the wheel 12. The stroboscopic light 36 is flashed as the wheel passes through the mid-point of the wheel excursions by initially inverting the electrical signal from the amplifier A2 and converting it to a square wave signal. Then, this square wave signal is differentiated by the capacitor C2 and the resistor R7. Positive and negative pulses will appear at the zero crossing points. Since it is known that the displacement of the unbalanced wheel will lag by 90° the locus of the unbalanced mass at resonant speed, the positive pulses appearing at the positive going zero crossing and corresponding to the 90° lag are utilized to trigger the stroboscopic light 36 via transistor Q1, silicon-controlled rectifier Q2, switch 38 and capacitor C3 as the wheel passes through the midpoint of the wheel excursion.

With the stroboscopic light in an off condition pointed at the wheel and watching the meter M1, the needle of the meter will rise as the wheel picks up speed. When the needle reaches its peak rise (resonant point) on the scale, it will start to drop. At this point, the spinner is preferably disengaged from the wheel 12 and the meter M1 is observed continually. As the wheel speed decreases and passes through the resonant point, the needle will rise again. When the needle starts to drop off this time as the wheel slows below its resonant velocity, this needle movement indicated the proper time to close the switch 38 to trigger and turn on the stroboscopic light and to note a reference mark such as a chalk mark on the tire which was placed beforehand or a distinctive feature on the wheel or tire. It should be noted that the switch 38 could be omitted, but in order to increase the life of the stroboscopic light 36 the switch 38 is closed only at the necessary time to observe the reference mark. During this critical vibration period, the reference mark will be illuminated periodically by the stroboscopic light and will appear to be stopped. The location of the unbalanced weight of the wheel will be at the bottom or 6 o'clock of the wheel when the stroboscopic light flashes. The wheel is then stopped and turned so that the reference mark is at the same location observed at the peak point of the vibration. After this, a counterbalancing weight of suitable value is place at the 12 o'clock position so that the same will be diametrically opposite the unbalancing mass.

For detecting and correcting dynamic unbalance, the vibration pick-up unit is attached to a frame component of the vehicle which responds to dynamic (horizontal) vibrations and the same procedure as described above for static unbalance is followed essentially. An adapter bracket assembly 118 as shown in FIGS. 9 and 10 can be utilized to facilitate the positioning of the pick-up unit 10 on its side so that the permanent magnet 58 contacts a backplate (not shown) on the wheel during dynamic unbalance.

From the foregoing description of the pick-up unit embodying the present invention, it can be seen that there is provided an improved pick-up unit of the displacement type for balancing rotating bodies. Further, simple and inexpensive electronic circuitry for activating the stroboscopic light for detecting and locating the apparent area of unbalance may be untilized with the improved pick-up unit.

While there has been illustrated and described what is at present to be a preferred embodiment of the present invention, it will be understood by those skilled in the art that various changes and modifications may be made and equivalence may be substituted for elements thereof without departing from the true scope of the invention. In addition, many modifications may be made to adapt a particular situation or material to the teachings of the invention without departing from the essential scope thereof. Therefore, it is intended that this invention not be limited to the particular embodiment disclosed as a best mode contemplated for carry-

What is claimed is:

1. A vibration pick-up unit for balancing rotating bodies such as vehicle wheels comprising:
   a housing having a tubular guide communicating with the interior of the housing;
   a plunger rod disposed telescopically in said tubular guide for axial and rotary movement;
   a permanent magnet attached pivotally on an end of said rod for engagement with a vibrating member of a wheel suspension system arising on rotation of the wheel;
   a first mounting member disposed within said housing and cooperating operatively with said tubular guide, said first mounting member being movable in response to the vibrations of the suspension system;
   a second mounting member, disposed within said housing adjacent said first mounting member;
   light means disposed in said second mounting member for generating a source of light;
   photo-sensitive means disposed in said first mounting member and being responsive to said light means for converting the vibrations corresponding to the displacement of the suspension system into an electric sinusoidal signal; and
   circuit means connected operatively to said photo-sensitive means for generating electric impulses corresponding to the positive going zero crossing of the sinusoidal signal to flash a stroboscopic light onto the rotating wheel in synchronism with the vibrations of the suspension system.

2. A vibration pick-up unit as claimed in claim 1, wherein said photo-sensitive means comprises a photopotentiometer and said light means comprises a lightemitting diode.

3. A vibration pick-up unit as claimed in claim 1, wherein said circuit means comprises a buffer amplifier operatively connected to said photo-sensitive means for converting the vibrations of the suspension system to the electric sinusoidal signal, a meter amplifier having its input connected to said buffer amplifier, and amplifier connected to said meter amplifier for inverting and converting the electrical signal therefrom to a square wave signal, and a differentiator network connected to said converting amplifier to convert the square wave signal to the electric impulses to flash the stroboscopic light.

4. A vibration pick-up unit as claimed in claim 3, wherein said differentiator network comprises a capacitor and a resistor connected to said capacitor.

5. A vibration pick-up unit as claimed in claim 3, further comprising switch means connected between said differentiator network and the stroboscopic light for flashing the stroboscopic light only at a desired time to illuminate the wheel in a position determinate of unbalance.

6. A vibration pick-up unit as claimed in claim 3, further comprising meter means including a meter coupled with the output of said meter amplifier for measuring the amplitude of the electrical signal to indicate the corresponding vibrations of the wheel suspension system.

7. A vibration pick-up unit as claimed in claim 6, further comprising switch means operatively coupled to said meter means for varying selectively the sensitivity of the meter.

8. A vibration pick-up unit for balancing rotating bodies such as vehicle wheels comprising:
   means for engagement with a vibrating member of a wheel suspension system arising on rotation of the wheel;
   light means for generating a source of light;
   photo-sensitive means operatively connected to said engagement means and being responsive to said light means for converting the vibrations corresponding to the displacement of the suspension system into an electrical sinusoidal signal; and
   circuit means connected operatively to said photo-sensitive means for generating electrical impulses corresponding to the positive going zero crossing of the sinusoidal signal to flash a stroboscopic light onto the rotating wheel in synchronism with the vibrations of the suspense system.

9. A vibration pick-up unit as claimed in claim 8 wherein said photo-sensitive means comprises a photopotentiometer and said light means comprises a lightemitting diode.

10. A vibration pick-up unit as claimed in claim 8, wherein said circuit means comprises a buffer amplifier operatively connected to said photo-sensitive means for converting the vibrations of the suspension system to the electric sinusoidal signal, a meter amplifier having its input connected to said buffer amplifier, an amplifier connected to said meter amplifier for converting and inverting the electrical signal therefrom to a square wave signal, and a differentiator network connected to said converting amplifier to convert the square wave signal to the electrical impulses to flash the stroboscopic light.

11. A vibration pick-up unit of the displacement type for converting vibrations of a body into an electrical signal corresponding to the displacement of said body comprising:
   light means for generating a source of light;
   photo-sensitive means in light receiving relationship with said light means
   means responsive to the displacement of said body for varying the light received by said photo-sensitive means, whereby said photo-sensitive means generates an electrical sinusoidal signal corresponding to said displacement; and
   circuit means connected operatively to said photo-sensitive means for generating electrical impulses corresponding to the positive going zero crossing of the sinusoidal signal to flash a stroboscopic light.

12. A vibration pick-up unit as claimed in claim 11, wherein said photo-sensitive means comprises a photopotentiometer and said light means comprises a light-emitting diode.

13. A vibration pick-up unit as claimed in claim 11, wherein said circuit means comprises a buffer amplifier operatively connected to said photo-sensitive means for converting the vibrations to the electrical signal, a meter amplifier having its imput connected to said buffer amplifier, an amplifier connected to said meter amplifier for converting and inverting the electrical signal therefrom to a square wave signal, and a differentiator network connected to said converting amplifier to convert the square wave signal to the electrical impulses to flash the stroboscopic light.

* * * * *